United States Patent [19]

Derkas

[11] 4,018,515
[45] Apr. 19, 1977

[54] SUNGLASSES

[75] Inventor: Alexander Derkas, Phoenixville, Pa.

[73] Assignee: American Polarizers, Inc., Reading, Pa.

[22] Filed: Mar. 6, 1975

[21] Appl. No.: 556,016

[52] U.S. Cl. .................................. 351/47; 351/49; 351/61; 351/106; 351/111; 351/123

[51] Int. Cl.² ...................... G02C 7/12; G02C 5/20

[58] Field of Search ............... 351/44, 47, 49, 111, 351/118, 123, 57, 41, 61, 106, 140, 119, 114, 116; 350/60, 140, 250

[56] References Cited

UNITED STATES PATENTS

| 1,968,193 | 7/1934 | Einson | 351/44 |
| 2,426,266 | 8/1947 | Haas | 351/44 X |
| 2,626,538 | 1/1953 | Frum | 351/123 |
| 2,792,744 | 5/1957 | Hirsch | 351/41 X |
| 3,689,136 | 9/1972 | Atamian | 351/44 |

FOREIGN PATENTS OR APPLICATIONS

| 314,505 | 9/1919 | Germany | 351/46 |
| 552,360 | 4/1943 | United Kingdom | 351/41 |

Primary Examiner—Paul A. Sacher
Attorney, Agent, or Firm—Smith, Harding, Earley & Follmer

[57] ABSTRACT

Sunglasses which comprise a unitary frame of flexible material having a front portion adapted to be supported on the nose and open portions adapted to be in front of the eyes and a pair of temples integral with the said front portion and each having an outer depending end portion adapted to pass behind the ear. Each said end portion has a tab removable to provide for the removal of a portion of the end portion nearest the ear to effectively lengthen the temple. A sun screening lens is secured to the front portion of the frame and overlies the open portions.

6 Claims, 5 Drawing Figures

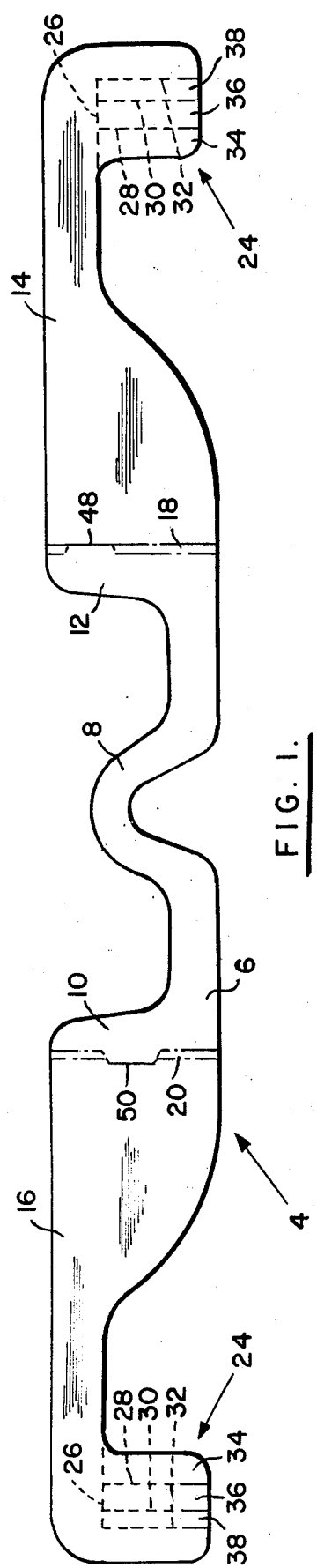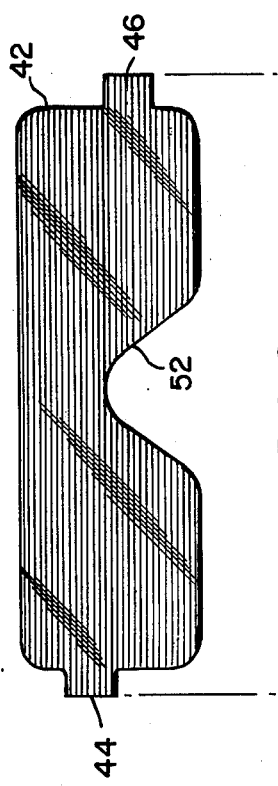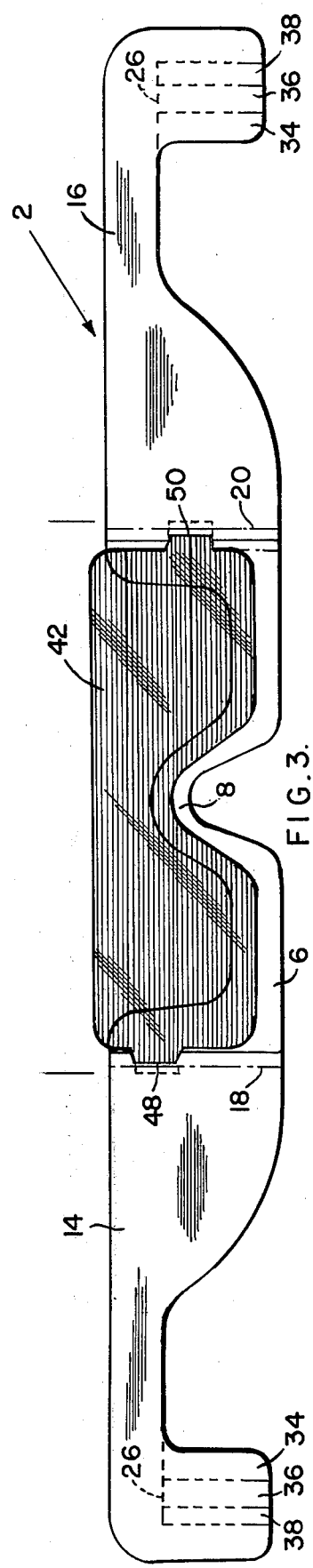

SUNGLASSES

BACKGROUND OF THE INVENTION

Inexpensive sunglasses made of cardboard are known. However, they must be stocked in different sizes to accommodate persons having different distances from the front of the head to the back of the ears. Further, they employ a separate lens for each eye. In accordance with this invention separate lenses for each eye are eliminated and the sunglasses are readily modified to provide for different sizes.

SUMMARY OF THE INVENTION

Sunglasses which comprise a unitary frame of flexible material having a front portion adapted to be supported on the nose and open portions adapted to be in front of the eyes and a pair of temples integral with the said front portion and each having an outer depending end portion adapted to pass behind the ear. Each said end portion has a tab removable to provide for the removal of a portion of the end portion nearest the ear to effectively lengthen the temple. A sun screening lens is secured to the front portion of the frame and overlies the open portions.

BRIEF DESCRIPTION OF THE DRAWINGS

FIG. 1 is a front view of the frame of sunglasses in accordance with the invention;

FIG. 2 is a rear view of a lens used in the sunglasses of the invention;

FIG. 3 is a rear view of the assembly of the frame of FIG. 1 and the lens of FIG. 2;

DETAILED DESCRIPTION

Sunglasses 2 have a unitary frame 4 of a flexible material such as cardboard, heavy paper stock or plastic sheeting. Frame 4 has a front portion 6 with a bridge 8 adapted to rest on a nose and end portions 10 and 12. The Frame is open between bridge 8 and end portions 10 and 12 to provide for openings in front of the eyes.

Figure 4:
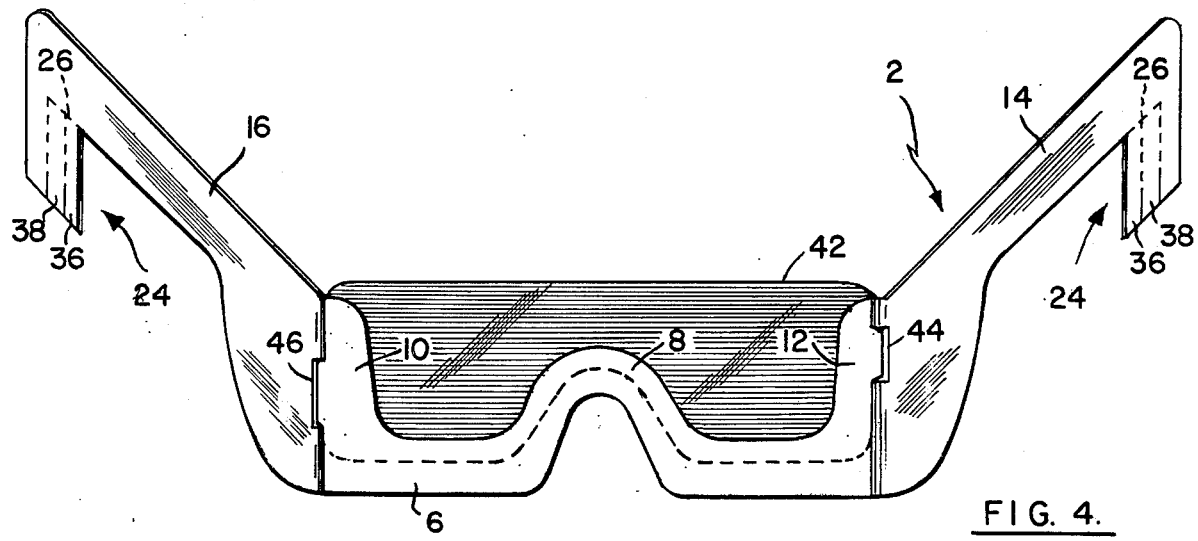
FIG. 4 is a front perspective view of the sunglasses of FIG. 3 with tabs removed to make a size adjustment.
Figure 5:
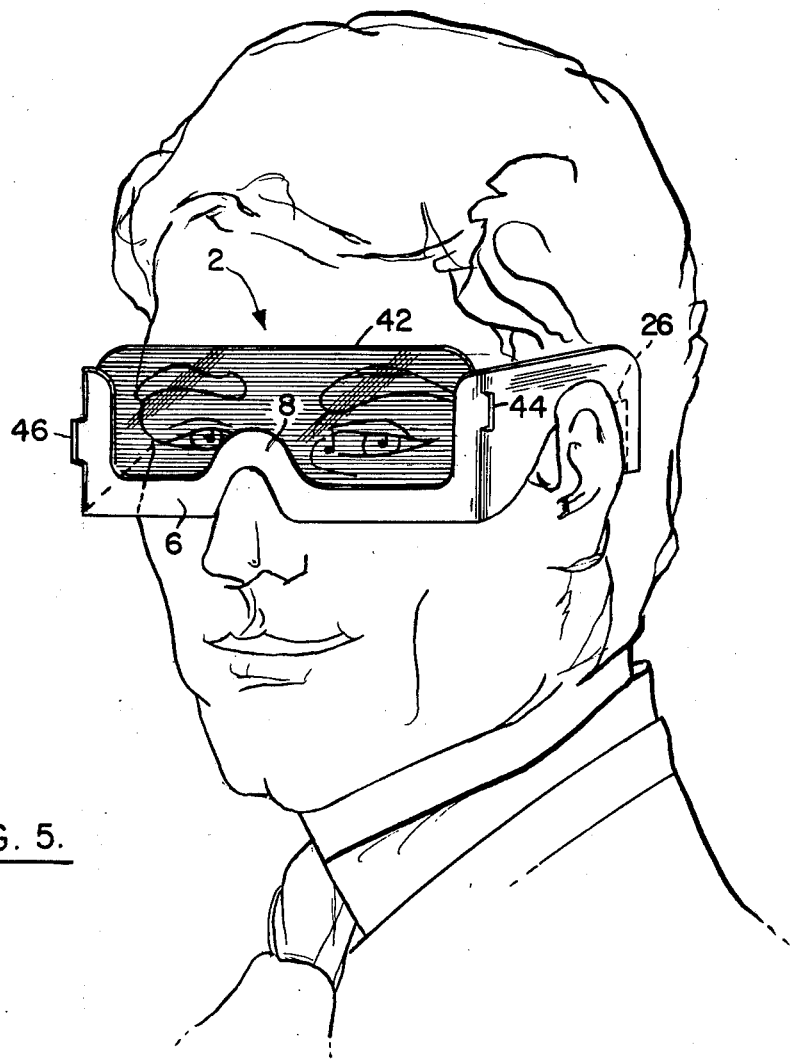
FIG. 5 is a front perspective view showing the sunglasses of FIG. 3 on a wearer.

A pair of temples 14 and 16 are integral with front portion 6 and are connected thereto by score lines 18 and 20, respectively, to facilitate their hinging. Each of the temples 14 and 16 has an outer depending end portion 24 adapted to fit behind the ear of a wearer. A horizontal line of weakness 26 and vertical lines of weakness 28, 30 and 32 on each end portion 24 form tabs 34, 36 and 38. The successive removal of these tabs will successively lengthen the temples to accommodate wearers having different distances from the front of their heads to the rear of their ears. To illustrate this point, tabs 34 are shown removed in FIG. 4.

A sun screening lens 42 of, for example, tinted plastic or glass or of a polarizer such as a uniaxial sheet of polyvinyl alcohol having incorporated therein a polarizing polyiodide with the polyvinyl alcohol sheet laminated between two sheets of glass or plastic (see U.S. Pat. No. 2,237,567 which is incorporated herein by reference) is removably secured to frame 4 by projections 44 and 46 received in punched out openings 48 and 50, respectively. The projections and openings are offset to provide greater stability for the lens. The lens has a recessed portion 52 to provide clearance for the wearer's nose and overlies the sighting areas between end portions 10 and 12 and bridge 8.

The sunglasses 2 can be placed in a single plane for compact shipment and are of very low cost and hence can be sold at ball parks and the like for use only one time. Being adjustable, only one size need be stocked.

The above described embodiment is illustrative and is not intended to be limiting.

I claim:

1. Sunglasses comprising:
   a unitary frame of flexible material having a front portion adapted to be supported on the nose and open portions adapted to be in front of the eyes and a pair of temples integral with the said front portion and each having an outer depending end portion adapted to pass behind the ear,
   each said end portion having a tab removable to provide for the removal of a portion of the end portion nearest the ear to effectively lengthen the temple, and
   a sun screening lens secured to the front portion of the frame and overlying the open portions.

2. Sunglasses in accordance with claim 1 in which the flexible material is cardboard.

3. Sunglasses in accordance with claim 1 having a plurality of removable tabs on each end portion to provide for effectively lengthening the temples to different lengths.

4. Sunglasses in accordance with claim 1 in which the sun screening lens lies in a plane adjacent the plane of the flexible material in the front portion of the frame and in which means provide for the repeated attachment of the lens to and removal of the lens from the frame.

5. Sunglasses in accordance with claim 4 in which the means to provide for the attachment and removal of the lens comprises an ear on each end of the lens in substantially the same plane as the lens and a slot in the frame for the reception of each ear.

6. Sunglasses in accordance with claim 4 in which the flexible material is cardboard.

* * * * *